United States Patent [19]

Sano et al.

[11] 4,113,666

[45] Sep. 12, 1978

[54] METHOD FOR PRODUCING STRONG-ACID CATION EXCHANGE FIBER BY TREATING FIBROUS POLYETHYLENE WITH GASEOUS SULFUR TRIOXIDE

[75] Inventors: Takezo Sano, Takatsuki; Akira Kobayashi, Ibaragi; Haruo Inoue, Kobe, all of Japan

[73] Assignee: Sumitomo Chemical Company, Limited, Osaka, Japan

[21] Appl. No.: 699,255

[22] Filed: Jun. 24, 1976

[51] Int. Cl.$^2$ .............................................. C08F 28/00
[52] U.S. Cl. ...................................... 521/29; 526/31; 521/33
[58] Field of Search ............................ 526/21, 30, 41; 260/2.2 R, 79.3 R, 79.5 NV

[56] References Cited

U.S. PATENT DOCUMENTS

| | | | |
|---|---|---|---|
| 2,447,762 | 8/1948 | Moruya | 260/79.3 R |
| 3,218,301 | 11/1965 | Moody et al. | 260/79.3 R |
| 3,740,258 | 6/1973 | Walles | 260/79.5 NV |
| 3,770,706 | 11/1973 | Walles | 260/79.3 R |
| 3,901,755 | 8/1975 | Martin et al. | 260/79.5 NV |
| 3,972,840 | 8/1976 | Luzuki et al. | 260/2.1 R |

FOREIGN PATENT DOCUMENTS 720,295  10/1965  Canada ........................................ 521/28

OTHER PUBLICATIONS

Chem. Abstracts – vol. 83, entry 98723z.

*Primary Examiner*—Joseph L. Schofer
*Assistant Examiner*—Peter F. Kulkosky
*Attorney, Agent, or Firm*—Stevens, Davis, Miller & Mosher

[57] ABSTRACT

A process for producing strongly acidic cation-exchange fiber, which comprises allowing fibrous polyethylene to react with gaseous sulfur trioxide.

9 Claims, No Drawings

METHOD FOR PRODUCING STRONG-ACID CATION EXCHANGE FIBER BY TREATING FIBROUS POLYETHYLENE WITH GASEOUS SULFUR TRIOXIDE

This invention relates to a process for producing strongly acidic cation-exchange fiber and, more particularly, to a process for producing strongly acidic cation-exchange fiber of the sulfonated type based on fibrous polyethylene.

It has heretofore been known that the sulfonic acid group may be introduced into polyethylene by treating the polyethylene with chlorosulfonic acid or fuming sulfuric acid in the liquid phase, or by first introducing the sulfonyl chloride group into polyethylene by allowing polyethylene to react with sulfur dioxide and chlorine under exposure to ultraviolet rays and thereafter hydrolyzing the sulfonyl chloride group with an alkali. However, the former process has disadvantages in that since the reaction is carried out by immersing the fibrous material in a liquid sulfonating agent, the removal of excess sulfonating agent from the fibrous material is very difficult, giving rise to a large amount of waste liquor which is difficult to treat and causes an increase in the material cost for sulfonation. The aforesaid latter process requires more complicated equipments and operations and still involves similar disadvantages to those mentioned above, because the hydrolysis is conducted in the liquid phase.

As a result of studies on the process for producing fibrous ion-exchangers, the present inventors have now found a novel process for introducing the sulfonic acid group into fibrous polyethylene, which process comprises treating fibrous polyethylene with gaseous sulfur trioxide to introduce the sulfonic acid group uniformly without injuring the fibrous form.

According to this invention, since the reagent used in the reaction is a gas, the amount of the unreacted reagent adsorbed by the fiber is very small and may be easily removed, thus contributing to the economy of material cost.

Being sulfonated in the form of fiber, the sulfonated product of fibrous polyethylene obtained according to this invention can be imparted with a high cation-exchange ability in the portion near the fiber surface. Such an ion-exchanger having the ion-exchange portion near the fiber surface has the remarkable feature of rapid diffusion and exchange of ions, quite different from conventional ion-exchangers of the styrene-divinylbenzene type and other crosslinked types which utilizes micropores as the site of ion-exchange. The present fibrous ion-exchanger is expected to be industrially useful and may find uses in a variety of fields such as, for example, biochemical field, treatment of industrial waste water, treatment of radioactive substances, and purification of contaminated air.

Although both the high-density and low-density polyethylene can be used in the present process, the high-density type is preferable, because it is more easily made into fiber. The fibrous polyethylene to be used is produced by any of the known methods such as melt spinning, flush spinning, cutting and splitting of stretched tape into fibrous form, and polymerization under shearing stress to form fibrous polymer.

As for the type of polyethylene fiber, although melt-spun continuous filament may of course be used, it is most preferred, for the purpose of introducing a great number of sulfonic acid groups in the surface layer, to use fibrous product obtained by the so-called flush spinning method which is carried out in such a way that, as disclosed in Japanese Patent Application Laid-Open Nos. 83,529/75 and 17,330/76, a polyethylene solution is ejected under an applied pressure through a nozzle. The flush-spun fibrous product is of low manufacturing cost and has a very large specific surface owing to its three-dimensional net-work structure composed of very fine fibrils, 1 – 5 $\mu$ in diameter. The flush-spun product is advantageous as a base material, because it can be used either as spun, that is, in the form of cord or net, or after having been subjected to beating and made into pulp.

The present process is characterized by introducing the sulfonic acid group into polyethylene in a heterogeneous reaction system so as to keep the fiber form unchanged. This sulfonation process is applicable not only to raw fibers but also to textile products such as, for example, woven fabrics, ropes, and nonwoven fabrics. The sulfonation proceeds by simply exposing fibrous polyethylene to an atmosphere containing sulfur trioxide.

A number of procedures for sulfonating fibrous polyethylene with gaseous sulfur trioxide are conceivable. For instance, sulfonated fibrous polyethylene is actually obtained by passing an inert gas stream containing sulfur trioxide through a bed of fibrous polyethylene packed in a column (column method), or by introducing the above-noted gas mixture into a reactor in which fibrous polyethylene is kept stirred by means of a stirring device, or by introducing gaseous sulfur trioxide into an evacuated reactor containing fibrous polyethylene (reduced pressure method).

Further, it was found that one of the most preferable modes of uniformly sulfonating a large lot of fibrous polyethylene is to treat the material in a rotating reactor (rotation method). This method has proved industrially advantageous, because it enabled a large amount of fibrous material to be easily kept stirred, uniformly treated, and little affected in uniformity of reaction by the flow rate of the gaseous mixture. This method is particularly useful for sulfonating polyethylene in the form of staple fiber or pulp.

The rotation method is illustrated below in detail.

The reactor may be of any shape such as, for example, spherical, cylindrical, prismatic, or V-shape. It can be provided with baffles on the interior wall. Fibrous polyethylene is sulfonated, for example, in such a reactor rotating about a horizontal axis. A stream of gas containing sulfur trioxide enters the reactor through an inlet on one side and leaves through an outlet on the opposite side after passing through the fibrous polyethylene being agitated. The adequate quantity of a charge of fibrous polyethylene varies depending on the shape, length, and bulk density of the fiber. It is desirable to charge the material so that it may be agitated by the rotation of the reactor. The adequate amount is easily determined in each case by trial. The rate of revolution of the reactor may also be easily determined.

If a large quantity of fibrous polyethylene is sulfonated in a stationary column, the reactant gas containing sulfur trioxide must be passed through at a high speed in order to ensure uniform sulfonation. Such an operational mode encounters the difficulties of locally excessive sulfonation which results in a decrease in mechanical strengths of the fiber and an injurious effect on the form of fiber, leading in some cases to a sulfonated product contaminated with significant amounts of powdered material.

If one tries to sulfonate a large quantity of fibrous polyethylene in a stationary reactor provided with a stirrer to ensure uniform contact of the gas with polyethylene, satisfactory agitation is not realizable owing to entanglement of the fibrous material or its twining around the stirrer.

The invention is further illustrated below in detail.

The concentration of sulfur trioxide used in this invention may be any of those at which sulfonation is able to proceed, but is preferably in the range from about 10 to about 80% by volume in order to enable the reaction to proceed effectively. At a concentration above 80%, uniform progress of the reaction is difficult, while at a concentration below 10% the reaction is undesirably retarded. The inert gas for use in diluting sulfur trioxide may be air, nitrogen, helium, neon, argon, or other gases having no adverse effect on sulfonation. Of these, nitrogen and air are particularly preferred also for economical reasons. The inert gas should be dried before use, otherwise the mist of sulfuric acid formed by the reaction of sulfur trioxide with the moisture contained in the gas will cause agglomeration of the fibrous material, thus interfering with uniform progress of the reaction. Further, the fibrous polyethylene, before treating with the gaseous sulfur trioxide, should be also dried.

The reaction temperature is in the range from the temperature at which sulfonation may proceed to the melting point of polyethylene, preferably from 10° to 90° C, depending on the way of carrying out the reaction.

The rate of introducing sulfur trioxide depends to a great extent on the concentration. In the rotation method and the column method, sulfur trioxide is introduced at a rate (per hour per g of polyethylene) of 0.001 to 10 g, preferably 0.01 to 1.0 g for the sake of easy control of the reaction.

In the present process, the degree of sulfonation may be controlled by regulating the concentration of sulfur trioxide, reaction temperature, rate of flow of sulfur trioxide, total amount of sulfur trioxide fed, or reaction period. The degree of sulfonation may be estimated from determination of the sulfur content by elementary analysis or of the ion-exchange capacity. A suitable sulfonation degree for the cation-exchange fiber is 0.1 to 30, preferably 2 to 20% by weight in terms of sulfur content, or 0.01 to 10 meq/g in terms of ion-exchange capacity. If the sulfur content exceeds 30% by weight, the fiber becomes undesirably deteriorated in mechanical strengths or undergoes a change in the fiber form, whereas if the sulfur content is below 0.1%, the sulfonated fiber shows only a slight ion-exchange capacity.

According to this invention, it is possible to select polyethylene of any fiber length and to obtain sulfonated polyethylene of corresponding length, long or short as required.

The fibrous ion-exchanger obtained according to the present invention is convenient in handling and may be utilized in the form of flock, string or cord, mat, felt, woven fabric, etc. The fibrous sulfonated polyethylene beaten to pulp-like short fiber form may be utilized in the form of sheet made by conventional paper-making techniques. The present fibrous ion-exchanger can be reinforced or held together by use of other materials. For instance, continuous filaments of sulfonated polyethylene are cut to suitable length and bound together into a bundle to be used as an ion-exchange cartridge; cut fibers in flock form can be loaded in a cylinder to be used as a cartridge.

The cation-exchange fiber obtained by the present process is used similarly to conventional cation-exchangers.

Since, in the present ion-exchanger, active sites are distributed in the surface layer rather than in micropores, diffusion and exchange of the ion are both rapid and regeneration as well as recovery of exchanged ions are both easy. These features may be utilized to the best advantage. Further, when subjected to repeated cycles of ion-exchange and regeneration, the present ion-exchanger hardly suffers from deterioration due to alternate swelling and contraction and to the impact exerted by osmotic pressure, in contrast to conventional ion-exchangers which utilize micropores as the site of ion-exchange. Consequently, the present ion-exchanger has the outstanding advantage of withstanding long service at a high concentration of electrolytes without undergoing deterioration.

The cation-exchange fiber obtained according to this invention may be successfully used in desalting and softening of utility water, separation and recovery of metal ions, and in various other fields, by taking advantage of the above-mentioned characteristic features.

The invention is illustrated below in detail with reference to Examples.

EXAMPLE 1

Fibrous polyethylene with three-dimensional network structure obtained by flush spinning from high-density polyethylene (Sumikathene Hard® of Sumitomo Chemical Co.; melt index, 6.2) was cut and beaten into pulp form. In a 50-liter rotary tank, was charged 1 kg of the resulting pulp-like high-density polyethylene. A stream of gaseous sulfur trioxide diluted with nitrogen to about 50% by volume was introduced at a rate of 1 liter per minute into the tank while it was rotated. In about 10 hours, 1 kg of sulfur trioxide was introduced. Thereafter, the unreacted sulfur trioxide remaining in the reaction system was purged by use of nitrogen. The sulfonated polyethylene pulp was discharged from the tank into 30 liters of water, collected by filtration, and washed with water. The first washing showed an acid concentration of about 0.1 N and was easily treated.

For comparison, the same high-density polyethylene pulp as used above was immersed in chlorosulfonic acid and allowed to react at 60° C for 3 hours. The sulfonated polyethylene was collected by filtration and poured into ice water. The quantity of chlorosulfonic acid adhered to the sulfonated polyethylene after customary filtration was nearly the same as that of polyethylene. The washing showed an acid concentration of as high as about 3 N, rendering the treatment of waste liquor very difficult. The loss in acid was large enough to make the process uneconomical.

The sulfonated polyethylene pulp showed an ion-exchange capacity of 1.5 meq/g.

EXAMPLE 2

In a glass column, 50 mm in diameter, was filled 50 g of the same high-density polyethylene in pulp form as used in Example 1. A nitrogen stream containing about 25% of sulfur trioxide was passed at a rate of 5 liters/minute through the polyethylene bed at room temperature. After about 8 hours, nitrogen was passed through the column to expel the unreacted sulfur trioxide. The sulfonated polyethylene, which had been turned black, was poured into 1 liter of water. The washing showed an acid concentration of 0.08 N. The sulfonated polyethylene pulp, after having been washed and dried, showed an ion-exchange capacity of 1.0meq/g.

EXAMPLE 3

Five grams of the same fibrous polyethylene as used in Example 1 were wound around a glass frame and placed in a reactor. After evacuation of the reactor, gaseous sulfur trioxide was introduced. The glass frame was rotated to ensure uniform progress of the reaction. As the sulfur trioxide concentration in the reactor decreased, the gas phase in the reactor was removed by means of an exhauster and fresh sulfur trioxide was introduced.

When all the polyethylene had turned black, the feed of sulfur trioxide was interrupted and the residual gas was removed by applying vacuum. The sulfonated polyethylene was immersed in 200 ml of water which thereafter showed an acid concentration of 0.04 N. The sulfonated polyethylene was thoroughly washed with water and dried to obtain 7.5 g of black fibrous material having an ion-exchange capacity of 1.2 meq/g.

EXAMPLE 4

In a 2-liter glass vessel, was charged 50 g of the same high-density polyethylene in pulp form as used in Example 1. Gaseous sulfur trioxide diluted with about 40% by volume of nitrogen was introduced at a rate of 500 ml/minute into the glass vessel while it was rotated at 40 – 50 rpm. After about 2 hours the residual sulfur trioxide in the vessel was expelled by introducing nitrogen. The sulfonated polyethylene pulp was poured into 1 liter of water, filtered, and washed thoroughly with water. The first washing showed an acid concentration of about 0.1 N. The resulting sulfonated polyethylene in pulp form had an ion-exchange capacity of 2.4 meq/g.

What is claimed is:

1. A process for producing strongly acidic cation-exchange fiber, which comprises charging fibrous polyethylene in a reactor and passing a gas comprising gaseous sulfur trioxide and an inert gas through said reactor to treat said fibrous polyethylene with said gaseous sulfur trioxide, while agitating the fibrous polyethylene by rotating the reactor.

2. A process according to claim 1, wherein the gaseous sulfur trioxide is a gas comprising 10 to 80% by volume of gaseous sulfur trioxide and 20 to 90% by volume of an inert gas.

3. A process according to claim 1, wherein the treating temperature is 10° to 90° C.

4. A process according to claim 1, wherein the polyethylene is high-density polyethylene.

5. A process according to claim 4, wherein the gaseous sulfur trioxide is introduced into the reactor at a rate of 0.001 to 10 g of $SO_3$ per hour per gram of the fibrous polyethylene.

6. A process according to claim 1, wherein the introduction rate of the gaseous sulfur trioxide is 0.01 to 1.0 g of $SO_3$ per hour per gram of the fibrous polyethylene.

7. A process according to claim 1, wherein sulfur content of the fibrous polyethylene which has been treated is 0.1 to 30% by weight.

8. A process according to claim 6, wherein the sulfur content is 2 to 20% by weight.

9. A process according to claim 1, wherein ion-exchange capacity of the fibrous polyethylene which has been treated is 0.01 to 10 meq/g.

* * * * *